(12) United States Patent
Liu et al.

(10) Patent No.: US 10,302,471 B1
(45) Date of Patent: May 28, 2019

(54) DEVICE FOR OBSERVING ABYSSAL FLOW CHANGE BASED ON DIFFERENTIAL PRESSURE MEASUREMENT

(71) Applicant: Ocean University of China, Qingdao (CN)

(72) Inventors: Tao Liu, Qingdao (CN); Guanli Wei, Qingdao (CN); Lei Guo, Qingdao (CN); Xiuqing Yang, Qingdao (CN); Xiujun Guo, Qingdao (CN); Dong Wang, Qingdao (CN); Yonggang Jia, Qingdao (CN); Minsheng Zhang, Qingdao (CN); Qingsheng Meng, Qingdao (CN); Xiaolei Liu, Qingdao (CN); Yongmao Zhu, Qingdao (CN); Jia Xin, Qingdao (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 16/265,979

(22) Filed: Feb. 1, 2019

(51) Int. Cl.
  *G01F 1/00* (2006.01)
  *G01F 1/34* (2006.01)
  *G01C 13/00* (2006.01)

(52) U.S. Cl.
  CPC ............... *G01F 1/34* (2013.01); *G01C 13/00* (2013.01); *G01C 13/002* (2013.01); *G01F 1/002* (2013.01); *G01F 1/005* (2013.01)

(58) Field of Classification Search
  CPC ...... G01N 33/1886; G01N 1/12; G01N 33/18; G01N 1/10; G01N 2001/021; G01N 1/16; G01N 33/1806; G01N 1/14; G01N 2021/6432; G01N 2021/6434; G01N 2033/1873; G01N 21/763; G01N 21/78; G01N 21/80; G01N 33/1826; G01N 11/08;
(Continued)

(56) References Cited

U.S. PATENT DOCUMENTS 5,381,751 A * 1/1995 Richards ................. B09B 1/002
  114/264
5,726,365 A * 3/1998 Vories ...................... G01C 5/04
  702/166
(Continued)

*Primary Examiner* — Andre J Allen
(74) *Attorney, Agent, or Firm* — Gokalp Bayramoglu

(57) ABSTRACT

A device for observing the changes in abyssal flow based on differential pressure measurement, includes differential pressure sensing chamber and base connected through communicating portion, controller provided inside communicating portion, floating body and releasing device. Floating body is located on differential pressure sensing chamber and retracted through releasing device. Sensing chamber includes ambient water pressure chamber in communication with hydrostatic pressure chamber. Communicating portion is blocked by spring sheet. The spring sheet is provided with optical fiber sensor. Hydrostatic pressure chamber is always in communication with seawater, and ambient water pressure chamber is always in communication with water in abyssal sedimentary layer. Releasing device includes electric winch provided with acoustic signal device. Base is provided with earth pressure sensor and weight member. Optical fiber sensor, acoustic signal device, and earth pressure sensor are connected with controller. Differential pressure at a position can be measured by feedback from each sensor.

10 Claims, 5 Drawing Sheets

(58) Field of Classification Search
CPC ...... G01N 17/008; G01N 1/18; G01N 1/2035; G01N 1/405; G01N 2001/1012; G01N 2015/0088; G01N 2021/1772; G01N 2021/1793; G01N 2021/4769; G01N 2021/556; G01N 2035/00881; G01N 21/15; G01N 21/55; G01N 21/645; G01N 21/8507; G01N 33/1833; G01C 13/00; G01C 13/008; G01C 13/006; G01C 13/004; G01C 5/06; G01C 13/002; G01C 21/16; G01C 5/04; G01C 9/06; G01C 9/14
USPC ...................................................... 73/170.29
See application file for complete search history.

(56) References Cited

U.S. PATENT DOCUMENTS

| | | | | |
|---|---|---|---|---|
| 8,463,568 | B1* | 6/2013 | Wynn | G01N 27/226 324/362 |
| 8,875,645 | B1* | 11/2014 | Webb | G01C 13/00 114/312 |
| 9,279,666 | B1* | 3/2016 | Balasubramaniam | G01B 11/165 |
| 2011/0174497 | A1* | 7/2011 | Den Boer | G01V 11/00 166/369 |
| 2013/0233079 | A1* | 9/2013 | Swartz | G01F 1/56 73/579 |
| 2013/0266380 | A1* | 10/2013 | Capron | F16L 1/24 405/184.4 |

* cited by examiner

DEVICE FOR OBSERVING ABYSSAL FLOW CHANGE BASED ON DIFFERENTIAL PRESSURE MEASUREMENT

TECHNICAL FIELD

The present invention relates to the field of ocean observation technology, and more specifically, to a device for observing the changes in the sedimentation state of the sedimentary layer caused by abyssal flow.

BACKGROUND

Abyssal flow is a common geological phenomenon, and abyssal transport sedimentation caused by abyssal flow is a relatively common sedimentary form. The abyssal flow sediments are often dominated by fine shoulder sediments, volcanic materials, or siliceous sediments, and also characterized by a common horizontal micro-layering. The abyssal flow transport sedimentation has a significant impact on the seabed and topographic reconstruction. Combined with the abyssal flow sedimentary motion state obtained by geological drilling, it is of great guiding significance to the study of the evolution of abyssal geological structures. By observing the dynamic change of the super-pore pressure value in the superficial sediments of the seabed, it is possible to obtain the abyssal flow transport sedimentation state relatively intuitively.

The conventional means of obtaining the super-pore pressure value in the superficial sediments of the seabed is to embed a pore pressure sensor by way of pore drilling for long-term observation. The specific implementation method is that the underwater robot is used to embed the pore pressure sensor at a certain position in the soil layer, and grouting and sealing are performed to prevent the sensor from contacting the external water environment, resulting in inaccurate measurement. The obtained pore water pressure value is corrected and converted into a super-pore pressure value, and further analysis is performed to obtain the influence of the abyssal flow transport sedimentation on the state of the sedimentary layer.

With the development of the technology, most of the existing pressure sensors can achieve differential pressure measurement. Among them, the optical fiber grating sensor has the characteristics of corrosion prevention and being water proof, which provides a good structural basis for realizing super-pore water pressure monitoring. During the measurement, one part of the sealed super-pore pressure measuring device penetrates into the seabed sediment, and the other part is located in the seawater. The connecting pipe of the device connects the upper seawater, and hydrostatic pressure is introduced into the inner compartment of the device to act on one side of the sensor. The pore water pressure in the sediment acts on the other side of the sensor through the permeable rock. The differential pressure value acting on both sides of the sensor is the super-hole pressure value of the sediments at the position.

However, the abyssal flow may change at any time and form a scouring and silting point on the observation point, that is, the seabed surface will become higher or lower with the effects of the abyssal flow. The sensor embedded in the superficial sediment will be completely embedded or sometimes exposed to the seabed surface with the change of the seabed surface, which will cause great inconvenience to the super-pore pressure measurement, and even cause the inability to measure the super-pore pressure value. The existing pressure observation devices still have many shortcomings in overcoming the effects of ambient dynamic changes.

SUMMARY

In view of the above problems, the objective of the present invention is to provide a device for reducing the effects of the abyssal flow and more accurately observing the changes in the abyssal flow.

The technical solution adopted by the present invention is as follows:

a device for observing the changes in the abyssal flow based on the differential pressure measurement, comprising a differential pressure sensing chamber 3, a base 8, a controller 5, a floating body 4 and a releasing device 2, wherein the differential pressure sensing chamber 3 and the base 8 are connected by way of a communicating portion, the controller 5 is provided inside the communicating portion, and the floating body 4 is located on the differential pressure sensing chamber 3 and is retracted by way of the releasing device 2; the releasing device 2 is provided between the floating body 4 and the differential pressure sensing chamber 3; the sensing chamber 3 comprises a hydrostatic pressure chamber 11 and an ambient water pressure chamber 12, the top of which is in communication with the hydrostatic pressure chamber, and the communicating portion is blocked by a spring sheet 15; the spring sheet 15 is provided with an optical fiber sensor inside; the top of the hydrostatic pressure chamber 11 is in communication with the seawater through the hydrostatic pressure channel 1, and the water inlet of the hydrostatic pressure channel 1 is located on the floating body 4, wherein the hydrostatic pressure channel 1 is a retractable channel, which expands and contracts with the release and retraction of the floating body 4; the bottom of the ambient water pressure chamber 12 is in communication with the water in the abyssal sedimentary layer through the ambient water pressure channel 16, with the inlet of the hydrostatic pressure channel 16 provided with a first permeable stone 14; the releasing device 2 comprises an electric winch which is wrapped with a cable and provided with an acoustic signal device, with the end of the cable connected to the floating body 4; the base 8 is provided with an earth pressure sensor 7 and a weight member 17; the optical fiber sensor, the acoustic signal device and the earth pressure sensor 7 are all connected with the controller 5; the controller controls the acoustic signal device to release a signal according to the signal feedback of the earth pressure sensor, so that the electric winch rotates or releases the cable to drive the floating body 4 to release and retract, and meanwhile the hydrostatic pressure channel 1 expands and contracts with the release and retraction of the floating body 4 to ensure that the water inlet of the hydrostatic pressure channel is always in the seawater; after the whole device is stabilized, the controller 5 can measure the differential pressure at the position through a signal of the fiber sensor.

Further, the hydrostatic pressure channel 1 is a flexible hose or a corrugated pipe.

Further, the top of the hydrostatic pressure channel 1 is provided with a second permeable stone 9.

Further, the communicating portion between the base 8 and the differential pressure sensing chamber 3 is a sectional connecting rod 22, which is locked by a locking device 18 connected to the controller 5.

Further, the maximum relative displacement between the base 8 and the controller 5 is less than three quarters of the length of the differential pressure sensing chamber 3.

Further, the floating body, in the shape of a door frame, is sleeved outside the differential pressure sensing chamber 3 and has a gap between the floating body and the differential pressure sensing chamber 3.

Further, the power winches are symmetrically provided.

Further, the releasing device 2 and the controller 5 are waterproof sealed.

Further, the weight members 17 are uniformly distributed on the base 8.

Further, the base 8 is further provided with a permeable pore 6 which is a through-pore through which the upper and lower through pores are uniformly provided on the base 8.

Beneficial Effects

The present invention realizes sensing the ambient pressure of the sedimentary layer and the hydrostatic pressure in a complex abyssal environment to obtain a differential pressure value at the measuring point. Through a later data correction, the differential pressure value is converted into a super-pore water pressure, and the dynamic change state of the sedimentary layer under the influence of the abyssal flow can be analyzed. In addition, the present invention can subtly avoid the influence of scouring and silting effects of the abyssal flow on the measurement. The abyssal flow washes the seabed surface, causing the seabed surface to descend, and the bottom structure of the device will sink until the structure of the permeable stone is covered by the sedimentary layer. The abyssal flow transports the siltation, which lifts the surface of the seabed and lifts the device, thus keeping the sensor capable of sensing the hydrostatic pressure. The device can effectively improve the adaptability of the differential pressure sensor to the external environment, thus more intuitively obtaining the super-pore pressure of the superficial sediment on the seabed.

In the figures, 1—hydrostatic pressure channel, 2—releasing device, 3—differential pressure sensing chamber, 4—floating body, 5—controller, 6—permeable pore, 7—earth pressure sensor, 8—base, 9—permeable stone of inlet pipe, 10—cable, 11—hydrostatic pressure chamber, 12—ambient water pressure chamber, 13—winch, 14—permeable stone, 15—spring sheet, 16—ambient water pressure channel, 17—weight plate, 18—locker, 19—power winch A, 20—power winch B, 21—seabed surface, 22—sectional connecting rod.

DETAILED DESCRIPTION OF THE EMBODIMENTS

Figure 1:
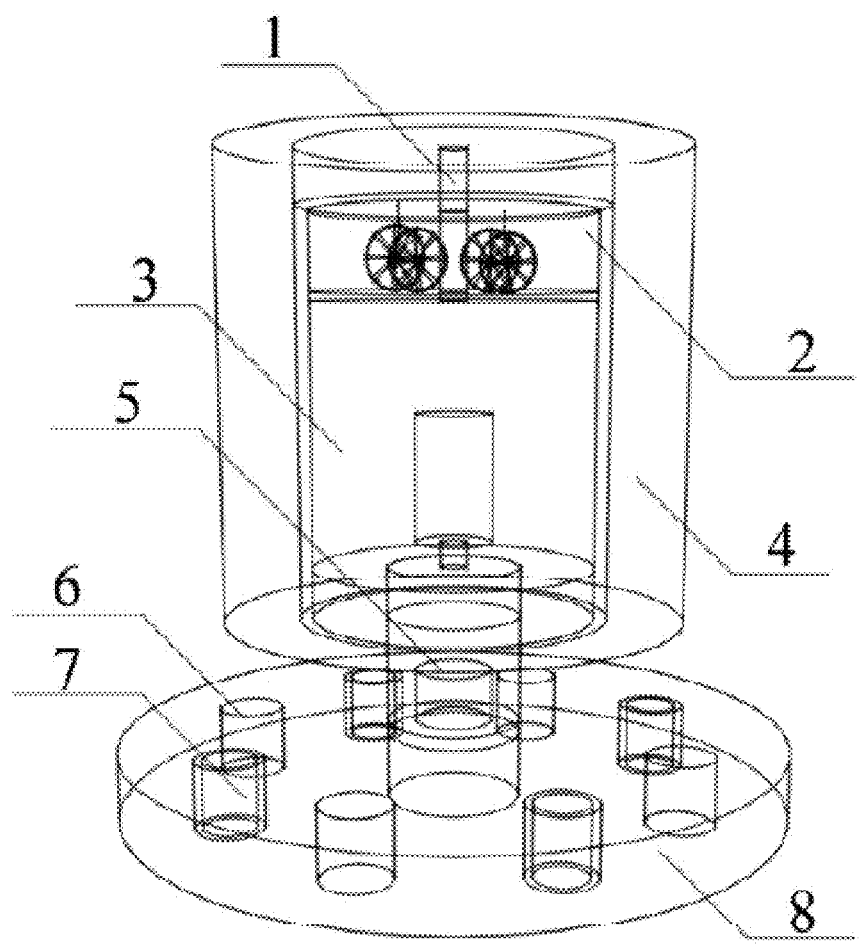
FIG. 1 is a schematic perspective view of the present invention.
Figure 2:
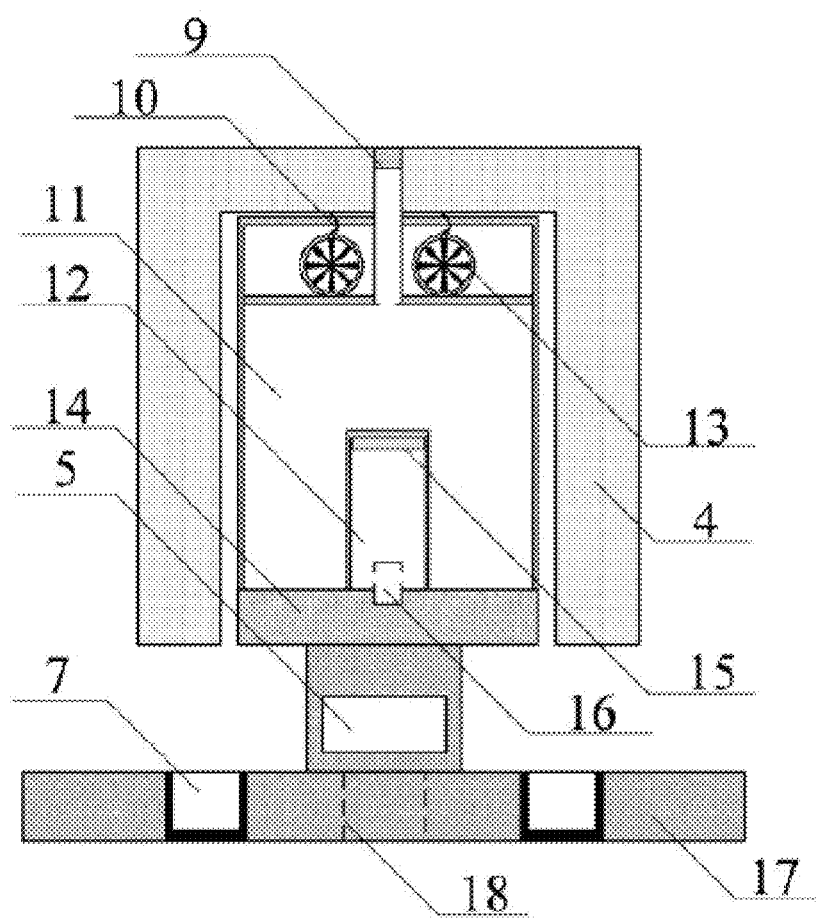
FIG. 2 is a cross-sectional view of the present invention.
Figure 3:
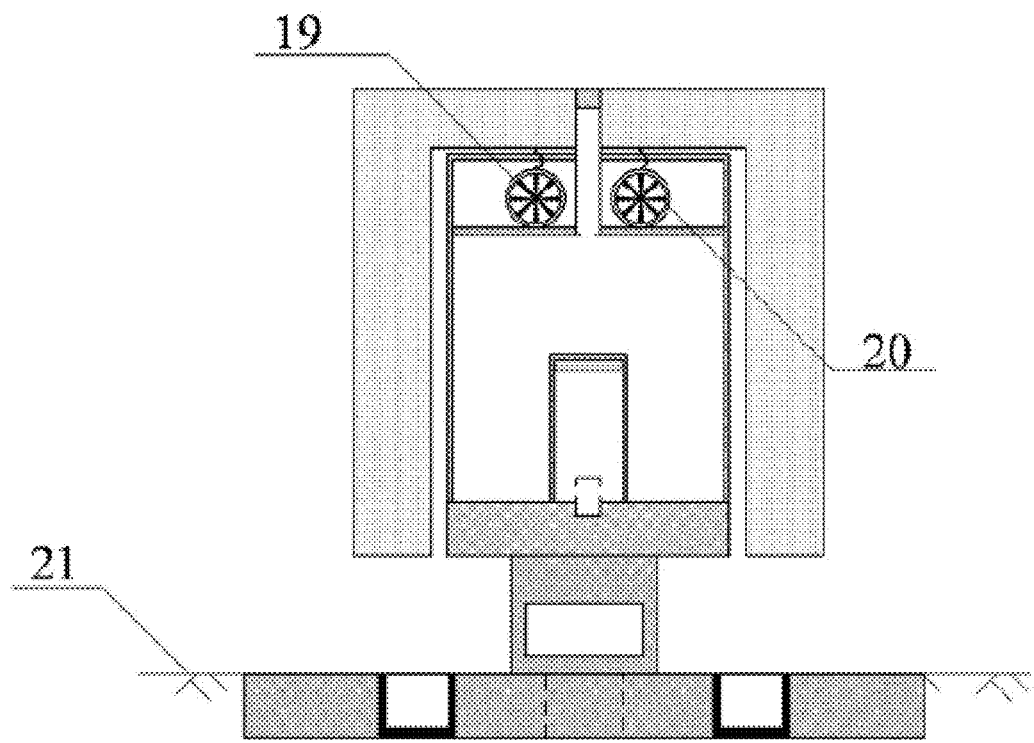
FIG. 3 is Schematic Diagram I of the working state simulation of the present invention.
Figure 4:
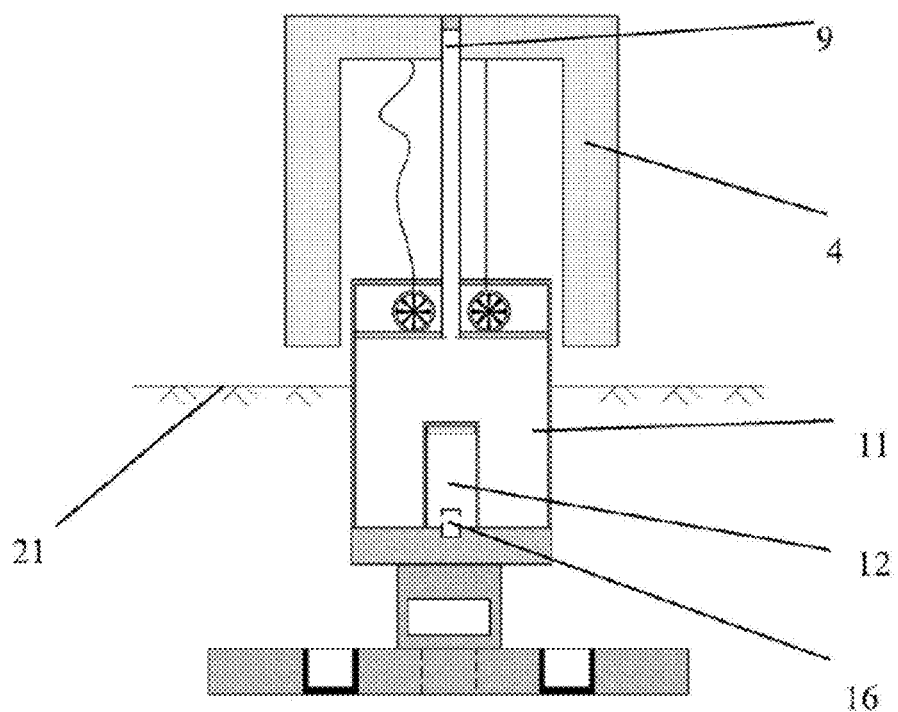
FIG. 4 is Schematic Diagram II of the working state simulation of the present invention.
Figure 5:
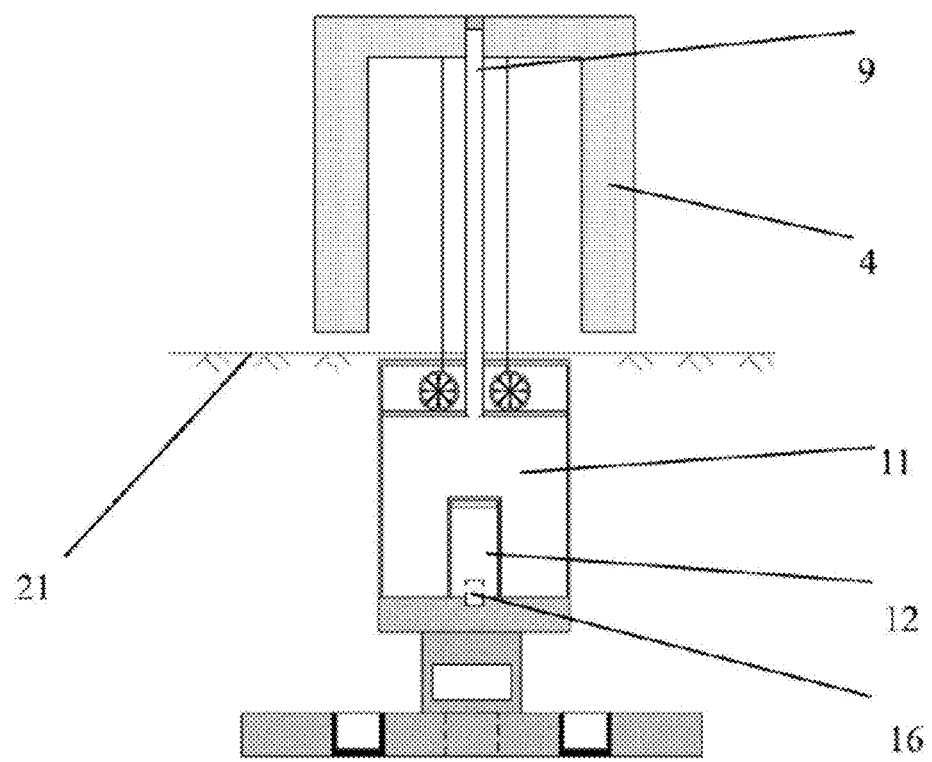
FIG. 5 is Schematic Diagram III of the working state simulation of the present invention.
Figure 6:
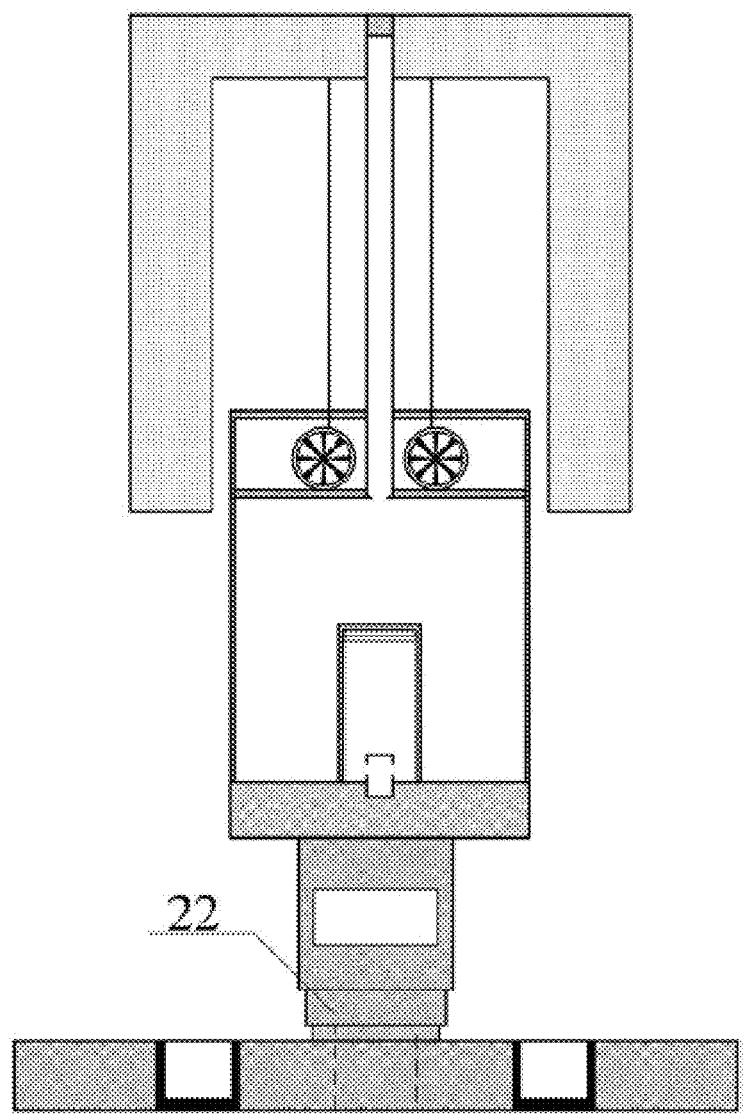
FIG. 6 is a schematic view of the working state of the locker of the present invention.

The present invention is further detailed in combination with the drawings and embodiments as follows:

as shown in FIG. 1 and FIG. 2, a device for observing the changes in the abyssal flow based on the differential pressure measurement, comprising a differential pressure sensing chamber 3, a base 8, a controller 5, a floating body 4 and a releasing device 2, wherein the differential pressure sensing chamber 3 and the base 8 are connected by way of a communicating portion, the controller 5 is provided inside the communicating portion, and the floating body 4 is located on the differential pressure sensing chamber 3 and is retracted by way of the releasing device 2; the releasing device 2 is provided between the floating body 4 and the differential pressure sensing chamber 3; the sensing chamber 3 comprises a hydrostatic pressure chamber 11 and an ambient water pressure chamber 12, the top of which is in communication with the hydrostatic pressure chamber, and the communicating portion is blocked by a spring sheet 15; the spring sheet 15 is provided with an optical fiber sensor inside; the top of the hydrostatic pressure chamber 11 is in communication with the seawater through the hydrostatic pressure channel 1, and the water inlet of the hydrostatic pressure channel 1 is located on the floating body 4, wherein the hydrostatic pressure channel 1 is a retractable channel, which expands and contracts with the release and retraction of the floating body 4; the bottom of the ambient water pressure chamber 12 is in communication with the water in the abyssal sedimentary layer through the ambient water pressure channel 16, with the inlet of the hydrostatic pressure channel 16 provided with a first permeable stone 14; the releasing device 2 comprises an electric winch which is wrapped with a cable and provided with an acoustic signal device, with the end of the cable connected to the floating body 4; the base 8 is provided with an earth pressure sensor 7 and a weight member 17; the optical fiber sensor, the acoustic signal device, and the earth pressure sensor 7 are all connected with the controller 5; the controller controls the acoustic signal device to release a signal according to the signal feedback of the earth pressure sensor, so that the electric winch rotates or releases the cable to drive the floating body 4 to release and retract, and meanwhile the hydrostatic pressure channel 1 expands and contracts with the release and retraction of the floating body 4 to ensure that the water inlet of the hydrostatic pressure channel is always in the seawater; after the whole device is stabilized, the controller 5 can measure the differential pressure at the position through a signal of the fiber sensor.

The main objective of the design of the device is to realize that the hydrostatic pressure channel 1 and the ambient water pressure channel 16 can stay in two different environments, wherein the hydrostatic pressure channel 1 is used to be in communication with the seawater for observing a hydrostatic pressure, and the ambient water pressure channel 16 is used to be in communication with the pore pressure of the sedimentation environment through the permeable stone 14 for sensing the pore pressure of the sedimentary layer. The pressure in two pressure chambers acts on the spring sheet 15 to deform the spring sheet 15 to act on the optical fiber sensor, and the differential pressure at the position can be obtained by the controller 5. The value can reflect the super-pore water pressure of the sedimentary layer at the position and invert the state of the sedimentary layer in this state, to determine a reference value for comparison of the changes in the sedimentary state of the sedimentary layer, and prepare to analyze the changes in the sedimentary state of the abyssal flow.

As shown in FIG. 3-6, the device can be placed on the seabed in the form of free fall penetration in use. With an appropriate prefabricated weight, the device reaches the seabed surface and will penetrate into the sediment under gravity. When the base 8 of the device is fully penetrated into the sediment, the earth pressure sensor 7 will begin to sense the pressure, the controller 5 will send an acoustic signal to the releasing device 2, the power winch will open until the cable 10 is in tension, or when the pressure value of the earth pressure sensor 7 no longer rises, the controller 5 stops transmitting an acoustic signal to the releasing device 2. At this time, the device should be in a state where the permeable stone 14 is completely embedded in the sediment. The number of power winches is not limited; the power winches are usually symmetrically provided, so that they are relatively stable and rapid during a recycling process. In this invention, the specific structure of the floating body 4 is not limited, provided that the floating body 4 can drive the hydrostatic pressure channel 1 to rise. In this invention, the specific structure of the hydrostatic pressure channel 1 is not limited, provided that the hydrostatic pressure channel 1 can expand and contract to achieve the communication of the seawater. In this invention, the number of the earth pressure sensors 7 is not limited herein, but is usually an even number and is equally spaced along the axial direction of the base; the maximum value among a plurality of earth pressure sensors 7 is used as a reference value for the adjustment of the whole device. In this invention, four earth pressure sensors 7 are used circumferentially equally spaced on the base.

Once the device has reached a steady state, the measurement and observation begin. According to the principle of a connector, the pressure in the hydrostatic pressure chamber 11 is the hydrostatic pressure (P1) at the point and the pressure in the ambient water pressure chamber 12 is the ambient pore pressure (P2) of the sedimentary layer at the point, and the two pressure values act on the spring sheet 15; the two pressure values are processed by the differential pressure sensor in the controller 5 to obtain the super-pore water pressure value (P3) at the point (the difference between the ambient pore pressure (P2) of the sedimentary layer and the hydrostatic pressure (P1)). The super-pore water pressure value (P3) can be used to invert the sedimentation state at the position.

The transporting effect of the abyssal flow partially lifts the seabed surface, and the pressure value of the earth pressure sensor 7 will continuously increase until it is greater than 1.5 times PE; at this time, the power winch is opened and the floating body 4 is floated upward to ensure that the hydrostatic pressure channel 1 is in a hydrostatic environment. Until the pressure value of the earth pressure sensor 7 no longer rises, the controller 5 stops transmitting an acoustic signal to the releasing device 2, and the power winch is in a locked state. The hydrostatic pressure channel 1 is still in communication with the seawater, and the sensing pressure in the hydrostatic pressure chamber 11 is the hydrostatic pressure (P1) at the point. The device will obtain the super-pore water pressure value (P3) after the seabed is reconstructed by the abyssal flow.

The scouring effect of the abyssal flow partially reduces the seabed surface, and the pressure value of the earth pressure sensor 7 will continuously decrease; if the releasing length of the cable 10 is greater than the height of the differential pressure sensing chamber 3, the controller 5 will transmit an acoustic signal to the release-recycle device 2, the power winch performs a retraction of the cable, and the pressure value of the earth pressure sensor 7 returns to normal until it is less than 0.5 times PE, and the power winch stops working. After the device is stabilized, the super-pore water pressure value (P3) at the point will be obtained after the seabed is modified by the abyssal flow.

By comprehensively analyzing the super-pore water pressure value (P3) when the relative height of the seabed varies, the state of the sedimentary layer of the seabed can be obtained, and the information of the changes in the abyssal flow can be analyzed. The releasing device 2 synchronously records the cable releasing dynamic changes and calibrates the information of the changes in the abyssal flow.

In this embodiment, the hydrostatic pressure channel 1 is a retractable hose or bellows, which can realize a wide range of expansion to better accommodate the flexural changes. The scalability of the hydrostatic pressure channel 1 is used to realize a large adjustable distance between the floating body 4 and the differential pressure sensing chamber 3, that is, the water inlet can be moved away from the differential pressure sensing chamber 3 when needed.

The top of the hydrostatic pressure channel 1 is provided with a second permeable stone 9. The measurement of the super-pore water pressure can be realized by the differential pressure, and meanwhile the impurities such as sediment can be prevented from entering the differential pressure sensing chamber 3.

In order to prevent the seabed surface from being partially lifted by the transporting effect of the abyssal flow, the differential pressure sensing chamber 3 is completely embedded in the sediment, and the communicating portion between the base 8 and the differential pressure sensing chamber 3 is a sectional connecting rod 22 locked by the locker 18 coupled to the controller 5. The locker 18 is a general-purpose technology of the prior art, and uses a common clamp-type locking structure (for example, the upper and lower connecting rods of the telescopic rod are provided with electromagnets which have opposite poles, and a power-on switch is controlled by a signal to realize the expansion or contraction of the telescopic rod; or other similar structures can be used, but will not be repeated herein) to meet the requirements, being controlled by the controller.

During the partial lifting of the seabed surface by the transporting effect of the abyssal flow, when the pressure value of the earth pressure sensor 7 is greater than the warning value PE (meanwhile less than 1.5 times PE), the locker 18 will be opened; at this time, the differential pressure sensing chamber is connected with the base 8 through the sectional connecting rod 22 which is a telescopic rod structure, and the floating body 4 will pull the differential pressure sensing chamber 3 and the controller 5 out of the sectional connecting rod 22 through the cable 10 by an extensible distance. At the same time, the maximum relative displacement between the base 8 and the controller 5 is less than three quarters of the length of the differential pressure sensing chamber 3, that is, the floating body 4 cannot pull the permeable stone 14 out of the sedimentary layer during a lifting process.

The scouring effect of the abyssal flow partially reduces the overload of the seabed surface, and the sectional connecting rod 22 of the communicating portion is reset by way of a gravity fallback, wherein the gravity fallback is realized in a way that the power winch is opened, and the cable 10 is in a relaxed state, so that the rod 22 naturally falls back relying on the gravity of the differential pressure sensing chamber 3 and the controller 5.

Other methods can also be used for a fallback, and are not limited herein, but the gravity fallback structure is the simplest and straightforward.

In this embodiment, a specific structure of the floating body is provided. In this embodiment, the floating body, in the shape of a door frame, is sleeved outside the differential pressure sensing chamber 3 and has a gap between the floating body and the differential pressure sensing chamber 3.

The floating body 4 is made of a material having a density lower than that of water and moves in cooperation with the hydrostatic pressure channel 1, that is, the floating body 4 ensures that the permeable stone 9 portion of the inlet pipe is always located in the seawater body, so as to ensure that the sediment rises of the seabed surface by the abyssal flow can be coped with and the accuracy of the measurement results is guaranteed.

In this embodiment, a specific power winch setting structure is provided, wherein two power winches (power winch A19 and power winch B20) are symmetrically provided. The device can be effectively and stably recycled in the process of recycling the floating body.

The releasing device 2 and the controller 5 are sealed with a rubber ring or other sealing device, and are not limited thereto. The watertight-seal setting can effectively prevent damage and aging of the device.

In this embodiment, the weight members 17 are uniformly distributed on the base 8.

The weight member is mainly used to ensure that the first permeable stone 14 can be completely embedded in the sediment to ensure the realization of the differential pressure measurement. The specific structure and weight of the weight member are set according to the actual situation of the sea area measured based on actual needs, and are not limited herein. For example, if the seabed quality in the sea area to be measured is relatively soft, the weight members cannot be designed too heavily, otherwise the weight members will sink too much into the seabed.

Permeable pores 6 are further provided in the base 8, and the permeable pores 6 are through pores penetrating vertically and uniformly provided on the base 8. The number and diameter of the permeable pores are not limited.

During the process of placing the whole device onto the seabed, the seawater passes through the permeable pore 6, so that the force on the whole device is more uniformly averaged, and the falling process is more stable. At the same time, the recycling of the device is also faster if the device needs to be recycled.

The above description is only a preferred embodiment of the present invention, and is not intended to limit the scope of the present invention. Any person skilled in the art may use the above-disclosed technical contents to change or modify the equivalent changes. The equivalent embodiment is applied to other fields, but any simple modification, equivalent change, or modification made to the above embodiments according to the technical essence of the present invention are still comprised in the protection scope of the technical solution of the present invention without departing from the technical solution of the present invention.

What is claimed is:

1. A device for observing the changes in abyssal flow based on differential pressure measurements, comprising:
    a differential pressure sensing chamber, a base, a controller, a floating body and a releasing device,
    wherein the differential pressure sensing chamber and the base are connected by way of a communicating portion, the controller is provided inside the communicating portion, and
    the floating body is located on the differential pressure sensing chamber and is retracted by way of the releasing device;
    the releasing device is provided between the floating body and the differential pressure sensing chamber;
    the differential pressure sensing chamber comprises a hydrostatic pressure chamber and an ambient water pressure chamber, wherein, a top of the ambient water pressure chamber is in communication with the hydrostatic pressure chamber, and the communicating portion is blocked by a spring sheet;
    an optical fiber sensor is provided inside the spring sheet;
    a top of the hydrostatic pressure chamber is in communication with seawater through the hydrostatic pressure channel, and a water inlet of the hydrostatic pressure channel is located on the floating body, wherein the hydrostatic pressure channel is a retractable channel, the hydrostatic pressure channel expands and contracts with release and retraction of the floating body;
    a bottom of the ambient water pressure chamber is in communication with the water in the abyssal sedimentary layer through the ambient water pressure channel, wherein, the water inlet of the hydrostatic pressure channel provided with a first permeable stone;
    the releasing device comprises an electric winch and an acoustic signal device, the electric winch is wrapped with a cable, wherein an end of the cable is connected to the floating body;
    the base is provided with an earth pressure sensor and a weight member; the optical fiber sensor, the acoustic signal device and the earth pressure sensor are all connected with the controller;
    the controller controls the acoustic signal device to release a signal according to a signal feedback of the earth pressure sensor, so that the electric winch rotates or releases the cable to drive the floating body to release and retract, and the hydrostatic pressure channel expands and contracts with the release and retraction of the floating body to ensure that the water inlet of the hydrostatic pressure channel is always in the seawater;
    the controller is configured to measure a differential pressure at a position through a signal of the fiber sensor after the device is stabilized.

2. The device for observing the changes in the abyssal flow based on the differential pressure measurement as claimed in claim 1, wherein, the hydrostatic pressure channel is a retractable hose or bellows.

3. The device for observing the changes in the abyssal flow based on the differential pressure measurement as claimed in claim 2, wherein, the top of the hydrostatic pressure channel is provided with a second permeable stone.

4. The device for observing the changes in the abyssal flow based on the differential pressure measurement as claimed in claim 3, wherein, the communicating portion between the base and the differential pressure sensing chamber is a sectional connecting rod locked by a locker coupled to the controller.

5. The device for observing the changes in the abyssal flow based on the differential pressure measurement as claimed in claim 4, wherein, a maximum relative displacement between the base and the controller is less than three quarters of a length of the differential pressure sensing chamber.

6. The device for observing the changes in the abyssal flow based on the differential pressure measurement as claimed in claim 5, wherein, the floating body is in a shape of a door frame and is sleeved outside the differential pressure sensing chamber, wherein a gap is provided between the floating body and the differential pressure sensing chamber.

7. The device for observing the changes in the abyssal flow based on the differential pressure measurement as claimed in claim 6, further comprising a plurality of power winches provided symmetrically.

8. The device for observing the changes in the abyssal flow based on the differential pressure measurement as claimed in claim 7, wherein, the releasing device and the controller are waterproof sealed.

9. The device for observing the changes in the abyssal flow based on the differential pressure measurement as claimed in claim 8, wherein, the weight member is uniformly distributed on the base.

10. The device for observing the changes in the abyssal flow based on the differential pressure measurement as claimed in claim 9, wherein, the base is provided with permeable pores, the permeable pores are through-pores, and the through pores are uniformly provided on the base.

\* \* \* \* \*